United States Patent [19]

Schippl

[11] Patent Number: 4,570,679
[45] Date of Patent: Feb. 18, 1986

[54] CONDUCTION OF LOW TEMPERATURE FLUID

[75] Inventor: Klaus Schippl, Hanover, Fed. Rep. of Germany

[73] Assignee: Kabelmetal Electro GmbH, Hanover, Fed. Rep. of Germany

[21] Appl. No.: 655,084

[22] Filed: Sep. 26, 1984

[30] Foreign Application Priority Data

Sep. 26, 1983 [DE] Fed. Rep. of Germany ....... 3334770

[51] Int. Cl.$^4$ ................................................ F16L 9/10
[52] U.S. Cl. .................................... 138/149; 138/113; 138/148; 174/28
[58] Field of Search ............... 138/111, 113, 114, 148, 138/149; 174/28, 29

[56] References Cited

U.S. PATENT DOCUMENTS

| 8,994 | 12/1879 | Merriam | 138/114 |
|---|---|---|---|
| 3,087,513 | 4/1963 | O'Rourke | 138/114 X |
| 3,512,581 | 5/1970 | Lawton | 138/114 X |
| 3,595,275 | 7/1971 | Steans et al. | 138/114 |
| 4,220,179 | 9/1980 | Scheffler et al. | 138/149 X |
| 4,303,105 | 12/1981 | Pohner | 138/114 X |
| 4,346,556 | 8/1982 | Frie et al. | 138/149 X |

Primary Examiner—James E. Bryant, III
Attorney, Agent, or Firm—Ralf H. Siegemund

[57] ABSTRACT

Two corrugated metal tubes in a low temperature conduit system are spaced apart by a ceramic spacer made of braided ceramic threads, each thread being composed of stranded or twisted together ceramic filaments, the space between adjacent loops of this spacer is filled with super-insulation being comprised of multiple metal foils spaced apart by a ceramic webbing, mesh, plaits, sheets or the like.

6 Claims, 2 Drawing Figures

CONDUCTION OF LOW TEMPERATURE FLUID

BACKGROUND OF THE INVENTION

The present invention relates to the conduction of deep cooled, e.g., cryogenic fluids under utilization of at least two concentrically arranged corrugated metal tubes spaced apart by suitable spacers, and wherein the annular space between the two metal tubes is evacuated while certain super-insulation is placed in that gap.

Cryogenic tubing is known, for example, for the conduction of liquid helium, wherein the conduit system is comprised of several concentrically arranged corrugated tubes, and wherein the innermost tube conducts the cryogenic liquid, i.e., helium, while the annular spacs between the particular inner tube and the respective next, radially outer tube is either used for a return flow or for purposes of thermal insulation. Generally speaking, the evacuation of annular space between two concentric tubes is very advantageous for obtaining a high degree of thermal insulation, and for reducing concurrently radial losses, it is advisable to provide a so-called super insulation in that space. This super insulation is comprised essentially of several layers, for example, of a synthetic ribbon coated with a metal layer, and the individual lays of this configuration may be kept in spaced relation by means of a synthetic mesh or the like.

The known conduit systems are disadvantaged by the fact that after the generation of a vacuum between the two metal tubes certain gases may emanate from the synthetic material which is used for some reason or another, for example, for purposes of super insulation in the annular gap space between the metal tube. The emanated gases therefore cause deterioration of the vacuum, and in fact the thermal insulation of this gap is drastically reduced. Another significant disadvantage of the known construction is to be seen in that the synthetic material used as insulation is not sufficiently resistant against higher temperature. For example, in the case of a temperature increase by about 100 degrees centigrade, these synthetics deform and thereby cause a change in the distance between the metal layers. These increased temperatures do not of course arise during normal operation, particularly during the conduction of a cryogenic liquid. However, it was observed that these high temperatures can in fact occur during the evacuation process of the gap space, i.e., prior to the use of the system. This is so because for reasons of efficiency evacuation is carried out usually at elevated temperatures, and temperatures in the range of 350 to 400 degrees centigrade for this purpose are quite common. The reason for heating the gas to be evacuated, particularly when the super insulation has already been included, is to be seen in that the surface of the super insulation can be depleted from gas molecules easier and faster when the temperature of the system as a whole is raised. This means that the period of time needed for evacuation, i.e., the time of pumping and the time generally of generating the vacuum, can be drastically reduced if one operates at an elevated temperature level as stated. This of course is seemingly an economical procedure. However, it was found that the temperature increase has detrimental effects of the type mentioned earlier.

A further disadvantage of the known method is to be seen in that amazingly enough the metal coated foils and synthetic lattice structure are not adequately resistant against radiation, but decompose under a certain radiation load. In view of the fact that the radiation is not a very strong one, this effect works slowly, but this is exactly a highly disadvantageous aspect because a seemingly perfect conduit system suddenly fails for reasons of the slowly working decomposing effect in its insulation structure. In fact it was found that the decomposition of the synthetic involved may produce direct contact between metal layers which were originally spaced apart metal coatings, and due to unfortunate circumstances several metal layers can come into contact and provide a heat conducting bridge in between an inner and an outer tube and in a completely inforeseeable manner, reducing locally the thermal insulation very drastically, and that in turn can lead to a complete system failure.

DESCRIPTION OF THE INVENTION

It is an object of the present invention to provide a new and improved conduit system for low temperature, e.g., cyrogenic liquids or fluids, having insulation which even under a high, i.e., operationally quite unusually high temperature, will not lose its thermal insulation, while on the other hand radiation will not cause deterioration and decompositon of insulative structure.

It is a specific object of the present invention to provide a new and improved thermal insulation in cyrogenic, i.e., low temperature conduit system, including at least two concentrically arranged metallic tubes spaced apart through suitable spacing facilities including super insulation but which is free from the deficiencies outlined above.

In accordance with the preferred embodiment of the present invention, it is suggested to provide a super insulation in a configuration of a multiple of super imposed metal foils, and the metal foils are separated from each other through a webbing, mesh, plait, fleece or the like made of fibers or ceramic threads. This mat, mesh, webbing or the like made of ceramic fibers is flexible, and it is, for example, at least as flexible as a conventional synthetic sheath, and can thus be wrapped around a tube for purposes of placement just as synthetic material has been used in the past.

As far as the material itself is concerned, a mesh webbing or mat made of ceramic threads is quite comparable to synthetic lattices of an analogous kind. In the preferred form of practicing the invention, one should use individual ceramic threads or fibers made of a plurality of thin and stranded or twisted ceramic fibers or filaments. In other words, the webbing, mat or mesh is made of thread material wherein each thread is composed of suitably combined thin ceramic fibers or filaments. This feature enhances greatly the flexibility of the webbing or mesh as a whole, and the temperature conduction of a particular individual ceramic thread in transverse direction is low as compared with the per unit thermal conduction of the ceramic taken by itself, simply on account of the fact that the individual ceramic thread is made of fiber and filament material.

Considering the cryogenic system as such, it is of advantage to provide the spacing in between concentric tubes with helically wrapped plaited or braided spacers made of a plurality of stranded or twisted together, plaited, or woven threads made of ceramic material, and spacing in between this helical configuration is made of a super insulation specifically constructed in accordance with the present invention. In other words, it is within the purview of this invention to provide a particularly configured helically wound ceramic spacer wherein the axially spaced apart loops are separated by a super insulation constructed from metal foils and sheetlike mats, plates, or the like, using ceramic fibers as outlined above.

It can thus be seen that the principle of the invention involves the replacement of spacing and/or thermal insulation material made of synthetic material by particularly configured ceramic spacers so that the thermal-chemical decomposition of the spacer under the influence of high temperatures and/or radiation is avoided. The spacer, as well as the super insulation, are basically of a helical configuration which is a feature permitting the conduit system to be made in an economical fashion. The conduit system, particularly in view of the fact that the metal tubing is corrugated, is and remains flexible as a whole and thus can be reeled on drums just like an electrical cable, and can be transported and installed by and from such a drum in very economic fashion.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

Proceeding now to the detailed description of the drawing, FIG. 1 illustrates a corrugated metal inner tube 1, and a likewise corrugated outer tube 2. These two tubes 1 and 2 are arranged in concentric relation to each other, and are radially spaced from each other and positioned in mutual relationship by means of a spacer arrangement 3. This spacer is helically wound around the inner tube 1, and the outer tube 2 is then placed on top of that spacer.

Figure 1:
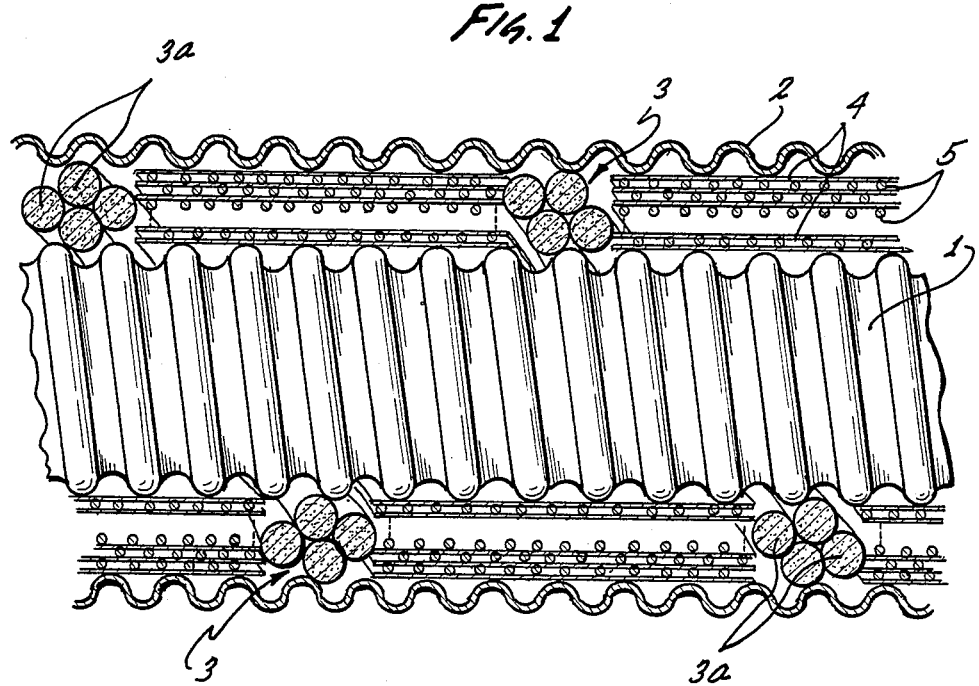
FIG. 1 is a cross section through a cryogenic conduit system with spacer facilities between two metal tubes constructed in accordance with the preferred embodiment of the present invention.

The spacer 3 is made of four strands 3a which are twisted or, better, plaited or braided together. Each individual strand of the spacer 3 is made of a large plurality of individual ceramic fibers or filaments which are stranded, twisted, or otherwise intertwined together to establish the ceramic threads, and four of these threads then are combined to establish this spacer. This spacer is helically looped around the tube 1 as stated. There is of course a axial gap in between adjacent loops of the helically placed spacer, and this gap is filled with super insulation. The geometry dictates that the super insulation is likewise helically wrapped around the inner tube 1. Now, in accordance with the present invention, this super insulation is composed of a plurality of metal foils 4 made, for example, of aluminum. In between the respective two adjacent foils 4, a mat webbing, mesh, or the like 5 is disposed wherein each of these units 5 is made from ceramic fibers.

Figure 2:
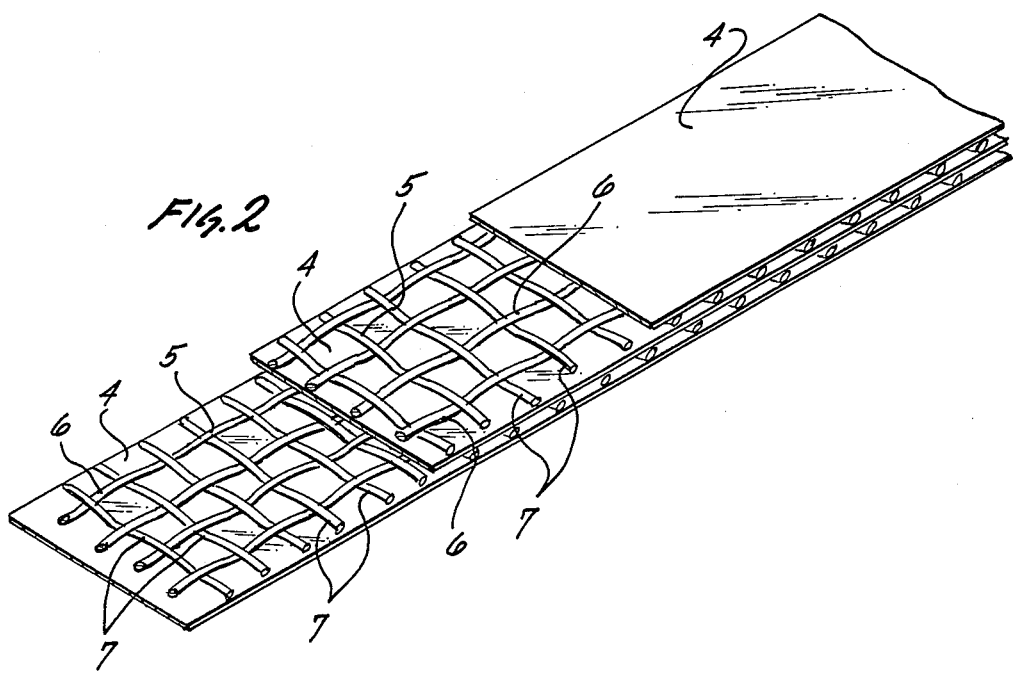
FIG. 2 illustrates somewhat schematically in partially cut open fashion, a super insulation used in the conduit system of FIG. 1 and being constructed in accordance with the preferred embodiment of the present invention for practicing the best mode thereof.

FIG. 2 illustrates the construction and configuration of the super insulation in greater detail. Due to the folded and cutaway illustration, one can see individual metal foils 4, each of which may, for example, have a thickness of 10 micrometers. These individual metal foils 4 are spaced apart by means of mats, woven sheets, webbing, or the like 5. The particular configuration is established presently by means of loosely interwoven ceramic threads 6 and 7. Each of these threads 6 and 7 is made of twisted or stranded together ceramic fibers. The individual ceramic threads 6 and 7 is approximately similar, at least in order of magnitude of the thickness of the metal foil. In other words, the threads 6 and 7 have a thickness of approximately 10 micrometers. The fibers or filaments of which the threads are made are correspondingly much thinner. The mesh width, i.e., the spacing in between two threads running in the same direction, is approximately one millimeter.

Upon constructing a tube system which uses the thermal insulation principle in accordance with the present invention, one will first make a corrugated inner metal tube 1, and upon this tube a ceramic spacer 3 is looped around. Next, one will provide a particular innermost metal foil 4, also by wrapping it around tube 1 in between adjacent loops of the spacer 3. Next, the webbing 5 is wrapped around the metal foil in a first layer. Next, another metal foil is wrapped on top of this first layer of ceramic material 5, and another ceramic mesh or webbing is wrapped on top of the second layer of metal foil, etc., until this space in radial direction between the loops of the ceramic spacer 3 has been in effect filled with metal foil 4 and webbing material 5. The thus thermally insulated inner tube 1 will then be surrounded in a tube manufacturing facility by means of a metal strip which is wrapped around longitudinally, for example, the inner tube plus spacer plus insulation arrangement, is then longitudinally seam welded and corrugated so as to establish the outer tube 2.

The invention is not limited to the embodiments described above, but all changes and modifications thereof not constituting departures from the spirit and scope of the invention are intended to be included.

I claim:

1. A conduit system for the conduction of low temperature, e.g., cryogenic fluids being comprised of at least two concentrically arranged corrugated metal tubes spaced apart in thermally insulated fashion, the space between the two metal tubes being evacuated, the insulation comprising:
    a spacer helically wrapped around the inner tube for supporting the outer one of the two tubes; and
    a super insulation including a plurality of spaced apart metal foils with ceramic mesh or webbing material placed in between the respective two adjacent metal foils.

2. In a system as in claim 1 wherein the mesh or webbing is made of ceramic threads, each thread being composed of a plurality of thin stranded or twisted together ceramic filaments.

3. Conduit system as in claim 1 wherein said spacer is comprised of plaited or braided ceramic threads.

4. Conduit system as in claim 3 wherein said threads consist of strands of twisted pleated together ceramic filaments.

5. A spacer arrangement in between two metallic concentrically arranged corrugated tubes, the spacer arrangement being comprised of a helical spacer made of plaited or braided together threads, each thread being comprised of a large plurality of ceramic filaments; and
    an axial space between adjacent loops of the spacer being filled with super insulation being comprised of metal foils spaced apart by ceramic fiber webbing.

6. A spacer arrangement as in claim 5, said fibers of the webbing being made of twisted together ceramic filaments.

* * * * *